(12) United States Patent
Kaufman

(10) Patent No.: US 6,654,367 B1
(45) Date of Patent: Nov. 25, 2003

(54) INTERNET AUDIO APPLIANCE

(75) Inventor: Steven B. Kaufman, Bridgewater, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/136,758

(22) Filed: Aug. 19, 1998

(51) Int. Cl.[7] .............................................. H04L 12/66

(52) U.S. Cl. ...................................... 370/356; 370/463

(58) Field of Search .............................. 370/352, 353, 370/354, 355, 356, 401, 402, 403, 404, 405, 463; 379/88.17, 93.01, 93.17; 709/217, 218, 219

(56) References Cited

U.S. PATENT DOCUMENTS

| | | | | |
|---|---|---|---|---|
| 5,852,610 A | * | 12/1998 | Olaniyan | 370/486 |
| 5,931,901 A | * | 8/1999 | Wolfe et al. | 705/26 |
| 6,012,086 A | * | 1/2000 | Lowell | 709/218 |
| 6,055,566 A | * | 4/2000 | Kikinis | 709/219 |
| 6,161,142 A | * | 12/2000 | Wolfe et al. | 709/230 |
| 6,169,734 B1 | * | 1/2001 | Wilson | 370/352 |
| 6,169,897 B1 | * | 1/2001 | Kariya | 455/426 |
| 6,246,672 B1 | * | 6/2001 | Lumelsky | 370/310 |
| 6,314,094 B1 | * | 11/2001 | Boys | 370/352 |
| 6,408,435 B1 | * | 6/2002 | Sato | 725/58 |

OTHER PUBLICATIONS http://windowsmedia.com/radiotuner/default.asp.*
Harry Newton, "Newton's Telecom Dictionary" 14th Edition, p. 192.*

* cited by examiner

Primary Examiner—Kwang Bin Yao

(57) ABSTRACT

An Internet audio appliance which receives audio content from a content provider via the Internet. In one embodiment, the Internet audio appliance plays the audio information data stream as it is received. In another embodiment, the audio information data stream is obtained at a convenient time, e.g., in the middle of the night, and stored in audio memory for later playback. A channel selector module allows a user to select from among a plurality of possible audio information sources available from various content providers on the Internet. In one embodiment, the channel selector module includes memory to store Internet access information (e.g., a phone number of an Internet service provider) and IP address information to identify the selected content provider. Based on the channel selected in the channel selector module, the Internet audio appliance automatically dials the IP server or other Internet access port, and requests from the selected content provider an audio information data stream corresponding to a desired subject, language, or other information. Channel memory locations may store any information necessary to access a content provider on the Internet, e.g., the telephone number of the Internet access port and/or an IP address of the selected content provider. In yet another embodiment, the Internet audio appliance includes a voice messaging system such as a telephone answering device (TAD). The TAD/Internet audio appliance accesses information when not in use. A central office may provide the desired Internet information to the TAD/Internet audio appliance or other telephone device so long as no incoming call requires use of the telephone line from the central office to the TAD/Internet audio appliance.

16 Claims, 6 Drawing Sheets

INTERNET AUDIO APPLIANCE

BACKGROUND OF THE INVENTION

1. Field of the Invention

This invention relates generally to audio appliances. More particularly, it relates to a customizable audio appliance which receives audio information from a content provider via the Internet.

2. Background of Related Art

Audio content programming has been traditionally provided using wireless radio frequency (RF) radios. For instance, FIG. 5 shows a conventional RF radio 402 including a tuner 404 and antenna 410. The antenna 410 of the RF radio 402 receives RF transmissions from the antennas 422a, 422b of a plurality of broadcasting stations 400a, 400b. An RF tuner 404 in the RF radio 402 is controlled to select a desired channel frequency corresponding to the transmission of the desired broadcasting station.

Traditional radio transmission as shown in FIG. 5 is limited by geographical distances, i.e., a particular RF radio 402 can receive only those RF transmissions reaching its antenna 410. Moreover, the quality of the received audio is dependent upon many environmental factors, including fading in a mobile environment and other distortion sources.

The Internet is a digital transmission medium which is quickly infiltrating all aspects of commerce. In recent years, computers and in particular personal computers (PCs) have readily gained access to the Internet. Using the Internet and a PC including a modem, audio card, and suitable application software, a content provider can provide an audio stream to the PC for playback using the audio card and speakers connected with the PC.

FIG. 6 shows a conventional PC based receiver for receiving audio broadcasts over the Internet.

In particular, FIG. 6 shows a content provider 512 which provides digitized audio information using a conventional Internet protocol, e.g., TCP/IP. The content provider 512 accesses the Internet 508 via an IP server 510. At the receiving end, a computer 502 such as a PC receives requested information from the Internet 508 via another IP server 506. The computer 502 includes a modem, audio card and speakers 504, and suitable application program for receiving and playing an audio program provided by the content provider 512.

One example of a commercial application software program for operation on a PC with audio card and speakers is called RealPlayer Plus™ available from Real Networks™. RealPlayer Plus™ allows a user to select for playback at a computer such as a PC including an audio card audio and/or video streams from any of a number of content providers.

For ease of use, and to keep up with the constantly growing list of content providers and continually changing Internet Protocol (IP) addresses of the same, a desired channel selection is made by RealPlayer Plus™ from a web page maintained and/or hosted by the manufacturer and accessed by a browser on the same PC which is running the RealPlayer Plus™ program. The web page is kept current with the IP addresses of currently available content providers. Upon selection of a desired content provider, the IP address and other identifying information for the audio stream from that content provider is downloaded from the web page to an application program (i.e., to the RealPlayer Plus) to play the audio stream on the PC.

Use of the Internet to transmit broadcast information such as radio broadcasts has provided the ability to overcome distance and environmental conditions which may otherwise deteriorate the quality and receivability of an RF transmission as in analog radio systems. However, a PC fully loaded with a modem, sound card, speakers and suitable application software to merely provide radio or video content is overkill, both in cost and in capability of the PC. Moreover, the user of such conventional PC based radio systems must power up the computer, activate the application program such as RealPlayer, and select a desired channel to receive a broadcast stream of information from the selected content provider before gaining access to the audio stream. This takes time away from a user's busy schedule. Additionally, conventional radio systems using the Internet to broadcast content such as audio programs require a significant amount of time to establish a telephone link with an IP server and the Internet, and require in most instances dedicated use of a telephone line which also serves as a household voice telephone line.

There is a need for a simplified Internet capable audio appliance which provides the advantages of the currently existing PC based audio content receivers, but without the disadvantages such as the prohibitive cost of a PC, the power usage of a PC, or the requirement for dedicated use of a telephone line.

SUMMARY OF THE INVENTION

In accordance with the principles of the present invention, an Internet audio appliance comprises a telephone line interface, a speaker, and a channel selector module. The channel selector module is adapted to allow a selection of a specific IP address corresponding to a source of an audio information data stream.

A method of providing Internet audio information over a telephone system in accordance with the principles of the present invention comprises providing an audio information data stream to a customer premises equipment over a telephone line, which is interrupted upon receipt of an incoming call to the telephone line. The incoming call is allowed access to the telephone line.

BRIEF DESCRIPTION OF THE DRAWINGS

Features and advantages of the present invention will become apparent to those skilled in the art from the following description with reference to the drawings, in which.

DETAILED DESCRIPTION OF ILLUSTRATIVE EMBODIMENTS

In accordance with aspects of the present invention, an Internet audio appliance receives audio content from a content provider via the Internet and has the ability to store the content in desired applications, particularly without requiring a PC or other general purpose computer.

Figure 1:
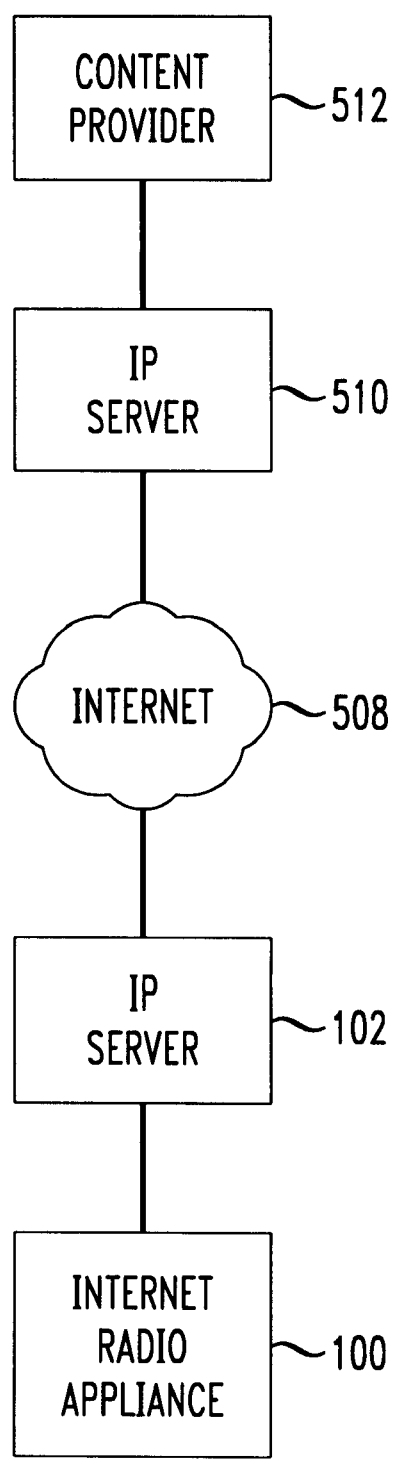
FIG. 1 shows an Internet radio system including a content provider, in accordance with the principles of the present invention.
Figure 6:
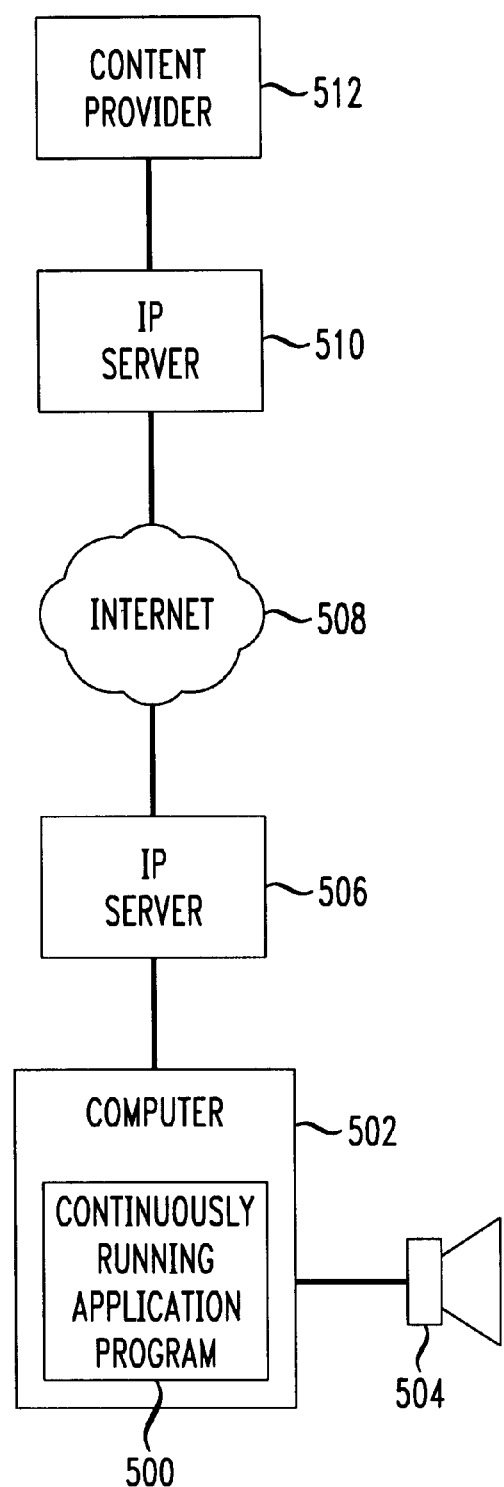
FIG. 6 shows a conventional PC receiving audio information from a content provider over the Internet.

In particular, FIG. 1 shows a content provider 512, an IP server 510 at the content provider's side, the Internet 508, and an IP server on the user's side as in conventional systems, e.g., as shown in FIG. 6. However, instead of a fully-loaded personal computer 502 and application program to receive audio information from the content provider 512 as shown in FIG. 6, the present invention provides a simplified Internet audio appliance 100 which automatically establishes a connection with the Internet and plays a desired channel selected using a dedicated channel button. In one embodiment, the Internet audio appliance 100 is part of a telephone answering device which has the ability to automatically dial an IP server during low traffic times during the day, e.g., after midnight, and requests access to an audio stream from a particular IP address, and stores the audio stream for later playback.

For instance, the embodiment of an Internet audio appliance 100 shown in FIG. 1 is included within a voice messaging system, and in particular a telephone answering device. This Internet audio appliance 100 includes conventional components and operability to provide conventional voice messaging service to a user, in addition to the inventive Internet radio capability. As shown in detail in FIG. 2, the functions of a telephone answering device are provided by a telephone line interface 228, a playback/record module 212, a speaker 214, a microphone 216, a controller 202, a digital signal processor (DSP) 220, a codec 218, and memory 226.

The DSP 220 includes a modem and codec to translate the modulated signal from the IP server 102 received by the TLI 228 into a digital data stream.

In addition to the conventional answering machine components, the Internet audio appliance 100 further includes a channel selector module 200. The channel selector module 200 allows a user to select from among a plurality of possible audio information sources from various content providers on the Internet. The audio information sources may be point-to-point type connections, subscriber only type systems, or Internet multicasting type systems servicing a multitude of Internet audio appliances.

In one embodiment, the channel selector module 200 includes memory to store preset Internet access information (e.g., a phone number of an Internet service provider) and an IP address to identify the desired content provider.

In a more versatile embodiment, the channel selector module 200 may store a plurality of IP addresses each corresponding to an audio information source. The audio information source may be one which broadcasts its audio information stream to any desired listeners, or one which has a pre-arranged subscription with a desired listener.

The desired audio information source is preferably selected using a knob or an image of a knob on a display which rotates in a desired order through a plurality (e.g., 1000) audio information sources. The IP addresses of each of the audio information sources may be manually set in the Internet audio appliance, e.g., by pressing an 'add channel' or similar button 201a after manual selection, e.g., through a web browser, and preferably erased using an 'erase channel' or similar button 201b. Alternatively, the audio information sources can be preset by "crawling" through various web sites on the Internet during off times, e.g., in the middle of the night, and setting in the possible choices those IP addresses which correspond to identified audio sources.

Audio sources may be identified, e.g., by information obtained in a header of received IP packets.

Based on the channel selected in the channel selector module 200, the Internet audio appliance 100 automatically dials the IP server 102 (FIG. 1) or other Internet access port, and requests from the selected content provider 512 an audio information data stream corresponding to a desired subject, language, or other information. For instance, the latest weather report may be obtained from a weather-related content provider, or a news broadcast focused on particular subjects may be obtained from any content provider located virtually anywhere in the world.

The audio stream from the content providers may include text information (e.g., ASCII text data) relating to the identification of the content source, or words to the music or other audio for display. If words are displayed based on received text data, they are preferably transmitted in coordination with appropriate portions of the audio stream as it is played.

In an alternative embodiment, text relating to commercial advertising may be transmitted along with the selected audio source.

The Internet audio appliance may also serve as a feature of a home stereo system. For instance, with proper connectivity to the Internet (e.g., using a telephone line), a tuner of a stereo system may include a conventional FM tuner, AM tuner, and perhaps auxiliary channels for other components such as a CD or tape player. However, most importantly, the stereo system would include an Internet tuner for playing audio streams from an IP addressable source in conformance with the principles of the present invention.

In accordance with the principles of the present invention, the received audio source may be played as received, i.e., without storage, or it may be stored in memory for later playback.

In conventional telephone answering devices the memory 226 is utilized to store voice messages left by callers. However, in accordance with the principles of the present invention, the memory 226 may be more generally utilized as desired to store not only voice messages but also (or instead) an audio information stream originated by a content provider, e.g., an Internet radio station. In the case of storage for later playback, the audio information data stream may be received from the content provider during unused periods, e.g., in the middle of the night, and compressed as necessary or desired with an appropriate routine in the DSP 220 in accordance with otherwise conventional voice message techniques using, e.g., code excited linear prediction (CELP), adaptive differential pulse code modulation (ADPCM) or other data compression technique. Thereafter, when requested and without necessarily requiring a repeated dial-up to an IP server and another establishment of a connection to the Internet at that time, the information previously received from the selected content provider over the Internet and previously stored in audio memory 226 is retrieved, decompressed and played back through the DSP 220, codec 218, playback/record module 212 and speaker 214.

By automatic download and storage of the audio information data stream during quiet periods, a user can select for listening audio information obtained from a content provider 512 without waiting for the device to re-establish a link to the Internet, e.g., by dialing up the IP server 102. Instead, as soon as playback of the previously stored audio information stream is requested, the audio information stored in audio memory 226 is listened to at the Internet audio appliance 100 substantially immediately.

Figure 3:
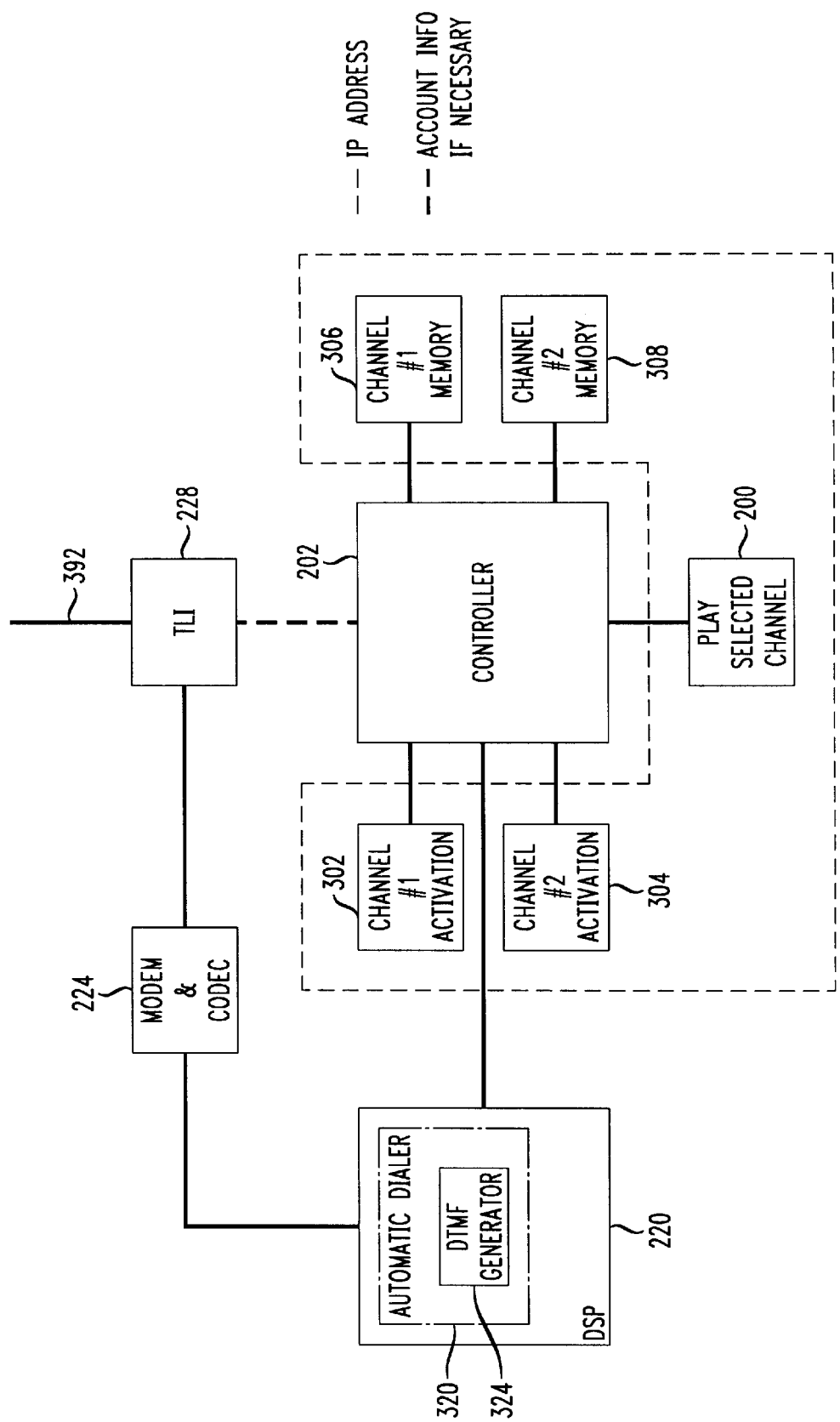
FIG. 3 is a more detailed diagram of a channel selector module in conjunction with other elements of the Internet audio appliance shown in FIG. 2.

FIG. 3 is a more detailed diagram of one embodiment of a channel selector module 200 which stores access information relating to desired channels.

In particular, FIG. 3 shows a channel selector module 200 including a plurality of channel selection or activation push buttons 302, 304, and a corresponding plurality of channel memory locations 306, 308 to store access information relating to the selected channel.

The activation push buttons 302 may be any selection device capable of indicating to the controller 202 which Internet radio channel is desired. For instance, the push buttons 302 may be separate, dedicated push buttons located on a front panel of the Internet audio appliance 100, or may be touch screen locations on a touch screen type display.

The channel memory locations 306, 308 may store any information necessary to access a content provider on the Internet. For instance, a telephone number of an Internet access provider may be included if access to the Internet is obtained through a dial up connection. The channel memory locations 306, 308 may also include an IP address of the desired audio data stream provided by the selected content provider.

Upon activation of one of the plurality of channel activation buttons 302, 304, the controller 202 accesses the channel access information stored in the corresponding channel memory location 306 or 308. Thereafter, either immediately or at a pre-scheduled time, the controller 202 directs the DSP 220 to use an automatic dialer module 320. The automatic dialer module 320 places a telephone line 392 in an off-hook condition and dials the relevant access telephone number using a DTMF generator 324. The DTMF generator 324 may be an algorithm operating on the DSP 220 or may alternatively be a separate circuit. Upon indication that a pathway to the Internet has been established, the controller causes the DSP 220 to send a message using a suitable protocol, e.g., TCP/IP, to the IP address specified in the selected channel memory location 306 or 308. Thereafter, the Internet audio appliance 100 receives an audio data stream from the desired content provider.

In an alternative embodiment, the channel access information is automatically accessed and stored in corresponding channel memory locations 306 or 308 during a period of inactivity, and later chosen for playback by activation of one of the plurality of channel activation buttons 302, 304. In this way, pre-selected audio can be accessed and stored, e.g., in the middle of the night, and a user may select for playback one or all of the stored audio streams, e.g., in the morning.

Figure 2:
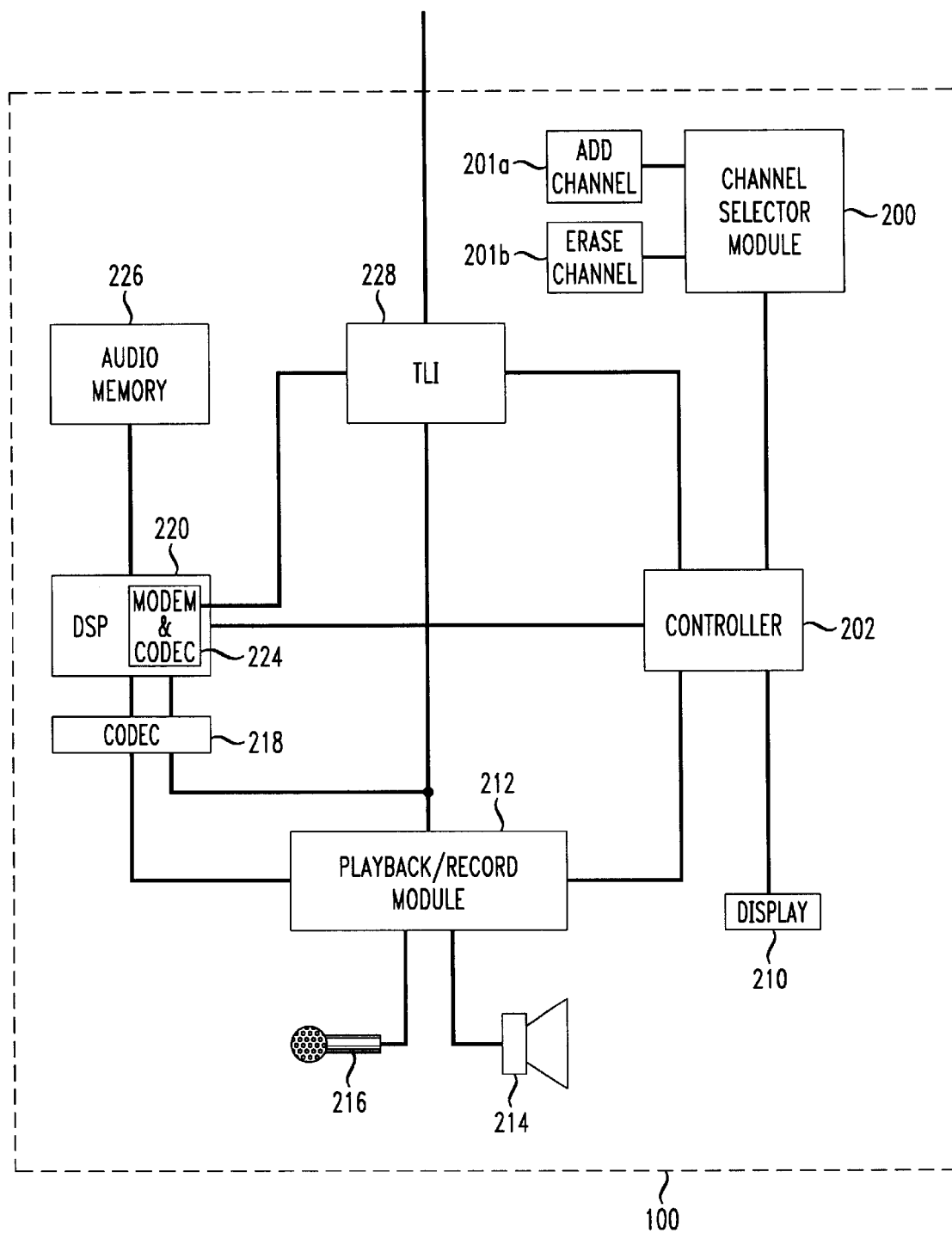
FIG. 2 shows a more detailed diagram of the Internet audio appliance shown in FIG. 1.

According to principles of the present invention, the Internet audio appliance may either play the audio data stream as it is received using the playback/record module 212, and/or store the audio data stream in audio memory 226 (see FIG. 2).

In the play-as-received mode of operation, the audio data stream is converted to an analog signal in a codec 218, and played back through the speaker 214 by the playback/record module 212.

When storing the audio data stream for later playback, the audio data stream is stored in the audio memory 226 until requested by the activation of a play Internet radio button 200 shown in FIG. 3.

The length of the stored audio data stream may be varied. For instance, if available audio memory is very limited, the controller 202 may allow only a few seconds or minutes of audio to be stored in the audio memory 226 before disconnecting from the content provider and/or Internet service provider. Alternatively, the controller 202 may be programmed via display prompts and keypad entry to store a fixed length of audio from the selected content provider, e.g., five minutes.

Although the present invention is shown with two processors, i.e., the DSP 220 and the controller 202, the principles of the present invention are equally applicable in a system having fewer controllers (i.e., only one) or more controllers. Moreover, although a DSP 220 and controller 202 are specifically shown, any suitable processor, e.g., microcontroller, microprocessor, DSP, may serve in either function.

Figure 4:
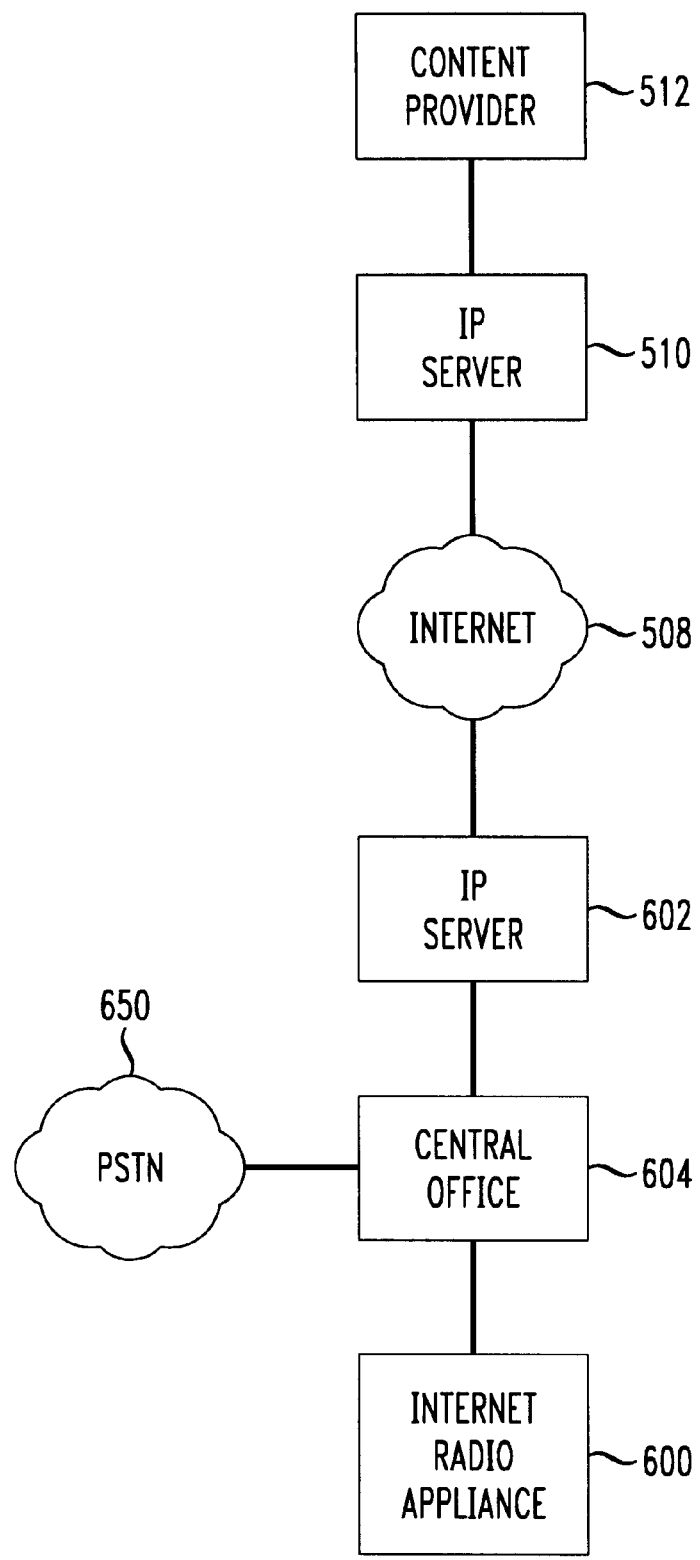
FIG. 4 shows another embodiment of an Internet radio system including a central office allowing use of a telephone line while access to the telephone line is not requested by a caller from the public switched telephone network (PSTN).
Figure 5:
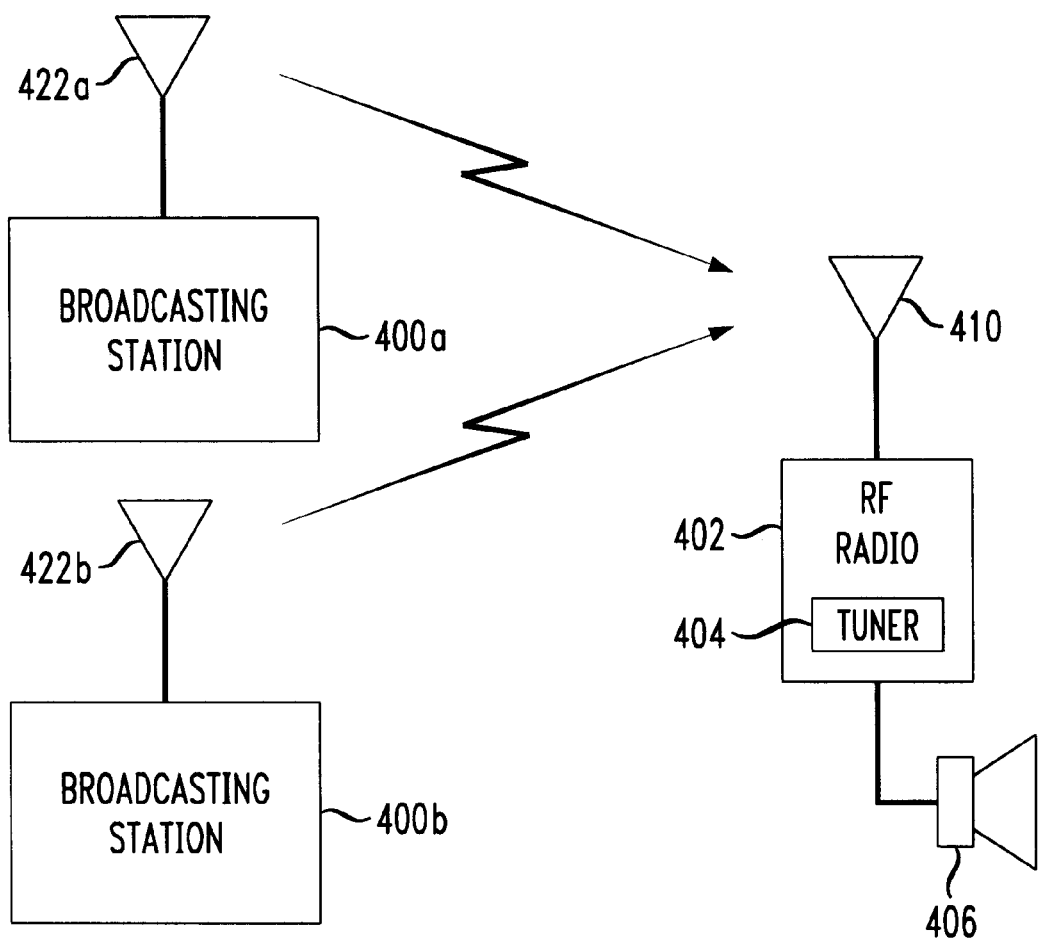
FIG. 5 shows a conventional radio frequency (RF) analog radio broadcast system.

FIG. 4 shows an advanced feature wherein the central office 604 participates in the Internet radio service.

In particular, in FIG. 4, an Internet audio appliance including a voice messaging system such as a telephone answering device (TAD) 600 may access an audio information via the Internet so long as no incoming calls are attempting to call the Internet audio appliance 600. However, when the central office 604 is informed of an incoming caller to the Internet audio appliance 600, instead of providing a busy signal to the calling party the central office cuts off the Internet audio appliance's access to the Internet and instead patches the calling party through to the Internet audio appliance 600. Preferably, once the calling party hangs up, the central office will again establish a connection between the Internet audio appliance 600 and the selected content provider. In this case, the central office 604 may also store the IP address of the selected content provider to reduce data communications between the Internet audio appliance 600 and the central office 604.

In FIG. 4, the audio data information stream may be continuously fed to the Internet audio appliance 600 for continuous play at the Internet audio appliance 600, may be continuously fed to the Internet audio appliance 600 only until interrupted by an incoming call, or may be fed to the Internet audio appliance 600 until a predetermined length of audio is received by the Internet audio appliance 600 and thereafter allow a calling party to gain access to the Internet audio appliance 600.

The present invention provides an Internet radio which is isolated from environmental conditions typically prevalent in analog RF radio systems. Moreover, the Internet audio appliance in accordance with the principles of the present invention may be adapted to not utilize a telephone line to the disadvantage of a caller who may be attempting to call the user over the same telephone line.

While the invention has been described with reference to the exemplary embodiments thereof, those skilled in the art will be able to make various modifications to the described embodiments of the invention without departing from the true spirit and scope of the invention.

What is claimed is:

1. An Internet audio appliance, comprising:

a telephone line interface;

a tuning knob;

a speaker; and a channel selector module;

said channel selector module being adapted to allow a selection of a specific IP address corresponding to a source of an audio information data stream through interaction of a user with only said tuning knob in said Internet audio appliance;

wherein said Internet audio appliance is customer premises equipment.

2. The Internet audio appliance according to claim 1, further comprising:
   a display adapted to display text relating to content of said audio information data stream.
3. The Internet audio appliance according to claim 2, wherein:
   said text is displayed in coordination with audible content of said audio information data stream.
4. The Internet audio appliance according to claim 2, wherein:
   said text is words to music represented by said audio information data stream.
5. The Internet audio appliance according to claim 1, wherein:
   said text relates to commercial advertising.
6. The Internet audio appliance according to claim 1, wherein said channel selector module further comprises:
   at least one channel selection push button corresponding to an audio stream obtained from a specific IP address.
7. The Internet audio appliance according to claim 1, further comprising:
   a plurality of channel selection push buttons.
8. The Internet audio appliance according to claim 1, further comprising:
   a channel memory location adapted to store information to access an audio data stream at a specific IP address.
9. The Internet audio appliance according to claim 8, wherein:
   said stored information includes a telephone number of an Internet access provider.
10. The Internet audio appliance according to claim 8, wherein:
    said stored information includes an IP address of a selected content provider.
11. The Internet audio appliance according to claim 1, further comprising:
    a channel play selector for activating play of said audio information data stream from said speaker.
12. The Internet audio appliance according to claim 1, further comprising:
    audio memory adapted to store at least a portion of said audio data stream obtained from a content provider over an Internet.
13. The Internet audio appliance according to claim 1, further comprising:
    an automatic dialer module to dial an Internet access provider.
14. The Internet audio appliance according to claim 1, further comprising:
    a telephone answering device integrated in said customer premises equipment.
15. The Internet audio appliance according to claim 1, wherein:
    said tuning knob is physically turned by a user of said Internet audio appliance.
16. The Internet audio appliance according to claim 1, wherein:
    said tuning knob is a virtual tuning knob displayed on a display and turned by user interaction with said display.

* * * * *